(12) United States Patent
Oberstarr

(10) Patent No.: US 6,890,282 B2
(45) Date of Patent: May 10, 2005

(54) DRIVELINE FOR MOBILE VEHICLES

(75) Inventor: Johann Gerhard Oberstarr, Passau (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 10/459,383

(22) Filed: Jun. 11, 2003

(65) Prior Publication Data

US 2004/0254044 A1 Dec. 16, 2004

(51) Int. Cl.$^7$ ................................................ F16H 3/44

(52) U.S. Cl. ..................... 475/323; 475/325; 475/311; 475/221; 475/225; 180/255; 180/372

(58) Field of Search .................... 475/323, 325, 475/331, 221, 225; 180/255, 372

(56) References Cited

U.S. PATENT DOCUMENTS

| | | |
|---|---|---|
| 2,776,583 A | 1/1957 | Williams |
| 2,998,735 A | 9/1961 | Elfes |
| 3,115,204 A | 12/1963 | Dence |
| 3,982,618 A | 9/1976 | Horsch |
| 4,159,657 A | 7/1979 | Stilley |
| 4,181,042 A | 1/1980 | Rau et al. |
| 4,424,874 A | 1/1984 | Koike et al. |
| 4,655,326 A | 4/1987 | Osenbaugh |
| 4,790,213 A | 12/1988 | Lasoen |
| 4,950,213 A | 8/1990 | Morisawa |
| 5,014,800 A | 5/1991 | Kawamoto et al. |
| 5,024,636 A | 6/1991 | Phebus et al. |
| 5,029,685 A | 7/1991 | Takase et al. |
| 5,064,530 A | 11/1991 | Duff et al. |
| 5,391,122 A | 2/1995 | Forster |
| 5,391,123 A | 2/1995 | Forster |
| 5,397,281 A | 3/1995 | Forster |
| 5,435,793 A * | 7/1995 | Varela et al. ................ 475/311 |
| 5,509,864 A | 4/1996 | Hauser |
| 5,645,148 A | 7/1997 | Saurin et al. ................ 192/4 A |
| 5,746,675 A | 5/1998 | Sugiyama |
| 6,090,006 A | 7/2000 | Kingston |
| 6,131,705 A | 10/2000 | Dahlen et al. |
| 6,290,048 B1 * | 9/2001 | Kohlmeier et al. ...... 192/221.1 |
| 6,367,591 B1 | 4/2002 | Gosda |
| 6,530,859 B2 | 3/2003 | Boston et al. |
| 6,685,595 B2 | 2/2004 | Ohkubo et al. |
| 6,817,963 B1 * | 11/2004 | Solka .......................... 475/323 |

FOREIGN PATENT DOCUMENTS

| | | | |
|---|---|---|---|
| DE | 2 328 929 | 12/1973 | |
| DE | 21 51 192 | 4/1975 | |
| DE | 23 57 451 | 5/1975 | |
| DE | 29 07 138 | 8/1987 | |
| DE | 38 32 649 | 7/1989 | |
| DE | 38 36 457 | 5/1990 | |
| DE | 39 05 292 | 8/1990 | |
| DE | 40 11 022 | 10/1990 | |
| DE | 42 06 087 | 9/1993 | |
| DE | 43 00 445 | 7/1994 | |
| DE | 195 23 543 A1 | 1/1997 | ........... F16H/57/10 |
| DE | 196 21 197 | 11/1997 | |
| DE | 196 40 146 | 1/1998 | |
| DE | 197 18 744 | 11/1998 | |
| DE | 100 63 100 | 8/2001 | |

(Continued)

*Primary Examiner*—Saul Rodriguez
*Assistant Examiner*—David D. Le
(74) *Attorney, Agent, or Firm*—Davis & Bujold, P.L.L.C.

(57) ABSTRACT

A driveline for a mobile vehicle comprises a one-step planetary transmission (7) in which the outer central wheel (10) is non-rotatably held, the inner central wheel (6) forms the output and the planet carrier (12) forms the output which can be connected with the housing (4) via a brake (14). To ensure an easy assembly, the output flange (17) is supported in the housing (4) via a first bearing (28) and the planet carrier (12) via a second bearing (26), one pivot (24) of the planet carrier (12) is non-rotatably held in one hole of the output flange (17).

20 Claims, 1 Drawing Sheet

FOREIGN PATENT DOCUMENTS

| | | | |
|---|---|---|---|
| EP | 0 722 051 | 7/1996 | |
| EP | 0 979 365 | 2/2000 | |
| EP | 1 234 993 A1 | 8/2002 | ........... F16D/55/40 |
| FR | 2 350 520 | 12/1977 | ........... F16H/57/10 |
| FR | 2 641 232 | 7/1990 | |
| GB | 2 043 186 | 10/1980 | |
| GB | 2 089 741 | 6/1982 | |
| GB | 2 220 178 | 1/1990 | |
| JP | 07-269662 | 10/1995 | |
| JP | 2001-200874 | 7/2001 | |
| WO | WO 98/50714 | 11/1998 | |
| WO | 98/50714 | 11/1998 | |

\* cited by examiner

DRIVELINE FOR MOBILE VEHICLES

FIELD OF THE INVENTION

The invention concerns a drive line for a mobile vehicle.

BACKGROUND OF THE INVENTION

Drivelines of the above kind are used for driving vehicle wheels, especially construction machinery like loaders. On one hand, it is important to directly brake the vehicle wheel in order to switch off in the braked state any additional movement of the vehicle wheel due to the toothing play of a ratio step rear mounted on the service brake and, on the other, to protect said brake against clogging. It is also important that the bearings by which the vehicle wheels are supported be configured so that it is possible to attain a sufficient duration even under the heavy vehicle weights of the construction machinery. It is also of importance that maintenance works in the driveline can be carried out without removing the axle from the vehicle.

EP 0 979 365 B1 discloses a vehicle transmission with integrated cooled brakes in which the output flange is directly supported in the housing, via wheel bearings, and is non-rotatably connected with the planet carrier via a toothing. On the radially outer area of the planet carrier, inner rotating discs of a multi-disc brake are situated by which the planet carrier can be connected with the non-rotatable housing. It is thus possible to protect the brake against clogging and to brake the output directly. The planet carrier has one pivot which projects into a hole of the output flange, the non-rotatable connection between the output flange and the pivot resulting via engaging gears.

U.S. Pat. No. 6,090,006 discloses a vehicle transmission for driving the vehicle wheels where the output flange is supported in the housing directly via two wheel bearings and the pivot of the output flange is non-rotatably held in a hole of the planet carrier via engaging gears. On the radially outer area of the planet carrier are the rotating discs of a multi-disc brake by which the planet carrier can be non-rotatably connected with the housing. It is very expensive to disassemble the output flange.

EP 1 234 993 A1 discloses a vehicle transmission for driving the vehicle wheels in which the output flange is supported in the planet carrier, via a centering pivot, and the planet carrier is supported in the housing via two wheel bearings. In order to fixedly connect the output flange with the planet carrier, the output flange is screwed with the planet carrier via axially disposed bolts.

U.S. Pat. No. 6,530,859 B2 discloses a planetary transmission where an output flange is non-rotatably connected with an output shaft, via engaging gears and the output shaft, and the planet carrier are supported in the housing, respectively, by a first bearing and a second bearing and between the radially outer area of the output shaft and a hole in the planet carrier; a centering bushing is situated which centers the planet carrier upon the output shaft. Immediately adjacent to the inner central wheel of the planetary transmission, a washer is situated with a connecting element by which the planet carrier can be axially connected with the output shaft. The disassembly of the output shaft is expensive.

U.S. Pat. No. 4,424,874 discloses, especially in FIG. 4, a driveline for a mobile vehicle in which a multi-disc brake is located between the inner central wheel and the non-rotatable housing and the output flange is fixedly connected with the planet carrier, via engaging gears, and the output flange and the planet carrier are supported in the housing, respectively, via a first bearing and a second bearing and the output flange is connected in an axial direction with the planet carrier, via a nut, situated directly adjacent to the inner central wheel. In this arrangement, the assembly and disassembly of the drive line are difficult, since the planetary transmission has to be disassembled for adjusting the wheel bearings.

The problem on which this invention is based is to provide a driveline for mobile vehicles where the output can be braked directly, via a multi-disc brake, where the wheel bearings have sufficient duration and the driveline can be easily disassembled.

SUMMARY OF THE INVENTION

According to the invention, the driveline for mobile vehicles has one output flange which is supported in the housing via a first bearing. The planet carrier is supported in the housing via one second bearing. The first and the second bearings are preferably placed in the same part of the housing. The planet carrier has a pivot pointing in the direction to the output flange and projecting into a hole of the output flange by which pivot the output flange is non-rotatably connected with the planet carrier. It is thus possible to design the output bearings with the optimal dimensions in accordance with requirements whereby the first bearing, for example, has a larger dimension than the second bearing. The inner ring of the second bearing supports itself, on one side, in the planet carrier and, on the other side, in an axial direction of the output flange whereby the inner ring of the second bearing is fixed in an axial direction by the output flange and the planet carrier. By virtue of this arrangement, an easy assembly can be ensured, since a costly adjustment of the wheel bearings is eliminated and a so-called "set-right support" can be used. Likewise, there is the possibility of easily disassembling the output flange, since when tapered rolling bearings are used as wheel bearings disposed in a so-called "O-arrangement", no great pressing-off forces are needed for the output flange during disassembly. Directly adjacent to the second bearing, the output flange and the pivot of other planet carrier are designed so that the output flange is centered upon the planet carrier in a radial direction. At the end of the pivot of the planet carrier, facing the output flange, the output flange and the pivot are configured so that a second centering of the output flange on the pivot of the planet carrier results. Said centering preferably results via a centering bushing which is between the pivot and the output flange. In one other embodiment, said centering bushing is cup-shaped whereby the output flange can be fixed in axial direction upon the pivot of the planet carrier while the cup-shaped bushing, on one hand, is braced via an axial connecting elements, such as bolts, upon the pivot and, on the other hand, supports itself in an axial direction in the output flange. Since the output flange is centered upon the planet carrier in the axial direction, via two spaced apart centerings, a tipping of the planet carrier in the output flange is effectively prevented whereby the wheel bearings obtain optimal operating conditions. Since the planet carrier is axially fixed in the output flange on the side of the pivot of the planet carrier facing the output flange, which planet carrier is easily accessible in the vehicle from outside, it is possible to disassemble the output flange without removing the axle of the vehicle. In addition, no special tool is at all needed for disassembling the output flange, since commercially available bolts can be used.

BRIEF DESCRIPTION OF THE DRAWING

The invention will now be described, by way of example, with reference to the accompanying drawings in which.

DETAILED DESCRIPTION OF THE INVENTION

Figure 1:
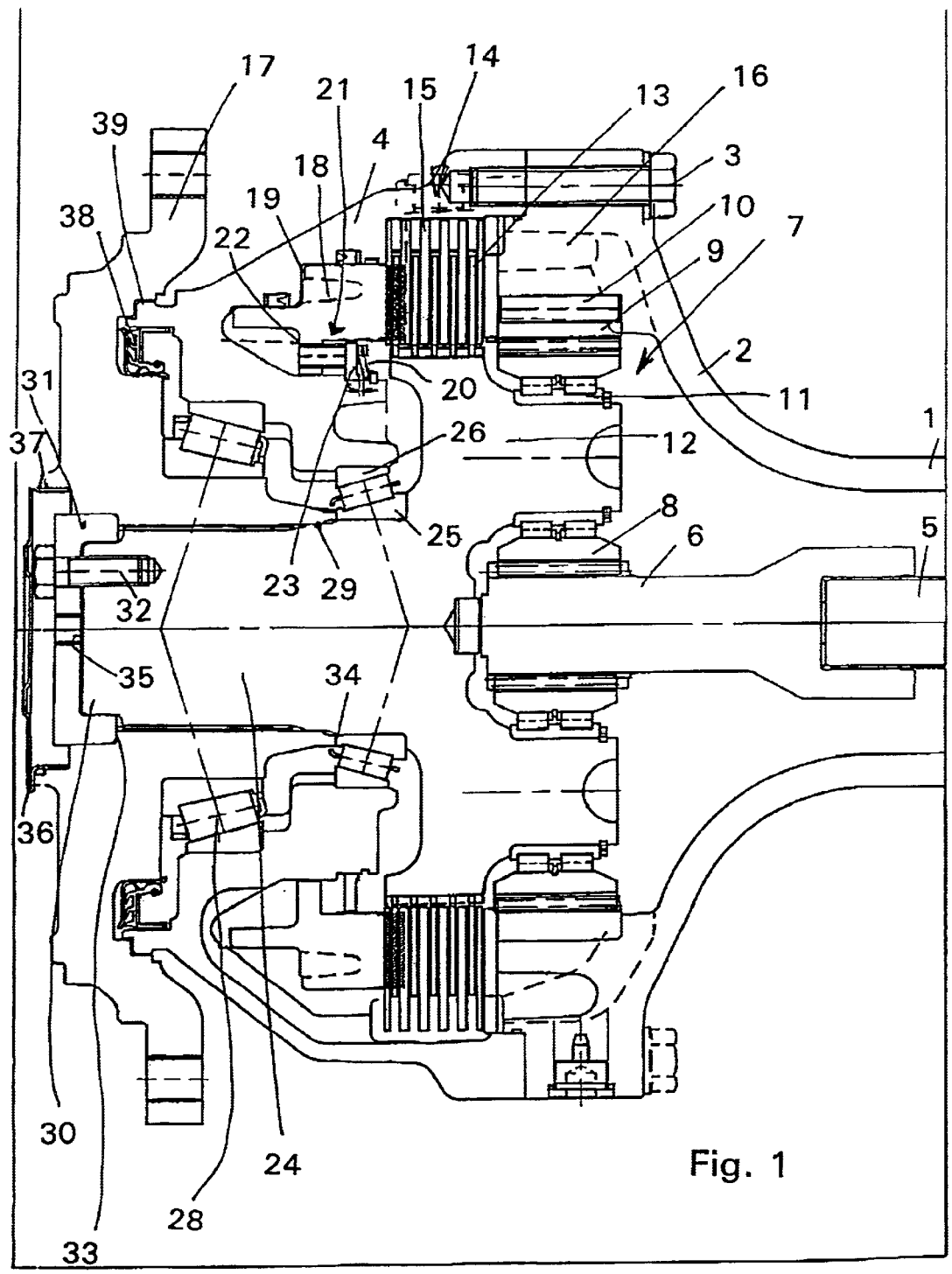
FIG. 1 shows a section of one side of the drive axle of the presently claimed invention.

The single FIGURE shows a section of one side of the drive axle with one axle 1 which can be connected with the vehicle (not shown) and which has a funnel-shaped extension 2 connected with the housing 4 via connecting elements 3. One input shaft 5 drives an inner central wheel (sun gear) 6 of a planetary transmission 7 and can also be designed integral with the drive shaft. The input shaft is preferably connected with a differential (not shown). It is also possible to connect the input shaft with a prime mover, such as an electromotor or a hydromotor. The inner central wheel 6 is in operative connection with the planetary gear 8, which planetary gear 8 supports itself on the outer central wheel (ring gear) 9 which is non-rotatably held. The outer central wheel 9 is preferably non-rotatably situated by means of bolts 10 in the funnel-shaped extension 2 or the housing 4. It is also possible to non-rotatably retain the outer central wheel 9, via a self-cutting toothing, a so-called "mouse toothing", in the funnel-shaped extension 2 or the housing 4. An arrangement of the outer central wheel, as in EP 0 979 465 B1, is also possible. The planetary gear 8 is supported, via the planetary bearing 11, upon the planet carrier 12. The inner rotating discs 13, of the multi-disc brake 14, are non-rotatably disposed on the radially outer area of the planet carrier 12, adjacent to the planetary gear 8. The outer discs 15 are non-rotatably located in the housing 4 or the funnel-shaped extension 2. While the inner discs 13 rotate, a cooling of the brake 14 occurs, due to the centrifugal acceleration of the lubricant, since the lubricant enters an outer area of the planet carrier 12 by the inner disc 13, flows through the multi-disc brake and, in the area where the outer discs 15 are non-rotatably held, exits again in an axial direction out of the multi-disc brake 14 being able to flow back via ducts 16. The multi-disc brake 14 is preferably situated between the planetary gear 8 and the output flange 17. It is also possible to dispose the multi-disc brake 14 in a direction of the funnel-shaped extension. A piston 18 is located between the multi-disc brake 14 and the output flange 17 which actuates the multi-disc brake 14 in a closing or engagement direction when pressure is applied in the space 19. During non-actuation, the piston 18 is pressed or returned back by a recoil spring 20. It is possible here to allow the recoil spring 20 to act upon an automatic resetting device 21 situated in the radially inner area of the piston 18. In said resetting device, one clamping sleeve 22 is situated in the piston 18 which acts upon a washer 23 which is axially movable within a defined path and the axial path is limited by stops on both sides. Since the automatic resetting device 21 is not fixed in a radial direction, it is also unnecessary to fix the piston 18 in the radial direction. The piston 18 and the resetting device are preferably in the area of the first and second bearings. The planet carrier 12 has one journal 24 in a direction to the output flange 17, upon whose surface is situated the inner ring 25 of the second bearing 26. The journal 24 is non-rotatably connected with the output flange 17, via a non-rotatable connection 27, such as a toothing or a meander-shaped configuration of the surface, or several bolts. Said non-rotatable connection 27 is located in a hole or through hole of the output flange 17. Since the non-rotatable connection 27 is situated in the hole of the output flange 17, its length can be optimally laid out as needed. The output flange 17 is supported in the housing 4 via a first bearing 28. The inner diameter of the first bearing 28 is preferably larger than in the second bearing 26. A centering 29 is situated immediately adjacent to the inner ring 25. The output flange 17 is centered upon the journal 24 via said centering 29. A bushing 31 is on the end of the journal 24, remote from the planetary gear 8, and centers the output flange 17 upon the journal 24. The output flange 17 is thus centered, via the bushing 31 and the centering 29, upon the journal 24 whereby the first bearing 28 and the second bearing 26 receive optimal operating conditions, since the output flange 17 cannot tip against the planet carrier 12. The bushing 31 is cup-shaped and is braced, via connecting elements 32, in a direction of the journal 24 and the bushing 31 presses the output flange 17 upon the inner ring 25 via its axial surface 33. Since the inner ring 25 abuts against the planet carrier 12, on one side, and against the axial surface 34 of the output flange 17, on the other side, the first bearing 28 and the second bearing 26 can be easily assembled without expensive adjustment works. It is thus possible to use so-called "set-right bearings". Since the bushing 31 and the connecting elements 32 are easily accessible in the vehicle from outside, the output flange 17 can be disassembled without removing the axle from the vehicle. Since only the first bearing 28 is upon the output flange 17, the output flange 17 can be disassembled without a great expenditure of force. This is possible because the inner ring 25 remains upon the planet carrier 12. The bushing 31 can be easily disassembled by a pressing-off screw 35. For protection of the connecting elements 32 and for easy sealing, the output flange 17 is closed by a lid 36 and a seal 37. The output flange 17 is sealed relative to the housing 4, via a radial shaft seal ring 38, a so-called "cassette seal". In order to protect the seal 38 from pollution, the output flange 17 and the housing 4 are configured so that a labyrinth 39 is created.

Reference Numerals
1 axle pipe
2 funnel-shaped extension
3 connecting elements
4 housing
5 input shaft
6 inner central wheel
7 planetary transmission
8 planetary gear
9 outer central wheel
10 bolt
11 bearing
12 planet carrier
13 inner discs
14 multi-disc brake
15 outer discs
16 ducts
17 output flange
18 piston
19 space
20 recoil spring
21 automatic resetting device
22 clamping sleeve
23 washer
24 journal
25 inner ring
26 second bearing
27 non-turnable connection
28 first bearing
29 centering
30 end
31 bushing
32 connecting element
33 axial surface 34 axial surface
35 pressing-off screw
36 lid
37 seal
38 seal
39 labyrinth

What is claimed is:

1. The prior art of record fails to show or render obvious the claimed driveline, as recited in the claim; specifically, wherein the planet carrier is releasably supporting a removable output flange; and, the inner ring of the second bearing is supported by the journal and sandwich between the output flange and the planet carrier for restricting axial movement thereof.

2. The driveline for a mobile vehicle according to claim 1, wherein the output flange (17) has a central hole which receives the journal (24).

3. The driveline for a mobile vehicle according to claim 1, wherein a toothing arrangement facilitates releasably support of the removable output flange (17) on the journal (24).

4. The driveline for a mobile vehicle according to claim 1, wherein the first bearing (28) has a larger inner diameter than an inner diameter of the second bearing (26).

5. The driveline for a mobile vehicle according to claim 1, wherein the multi-disc brake (14) is located between the output flange (17) and the planetary gear (8).

6. The driveline for a mobile vehicle according to claim 1, wherein a first end of the output flange (17), located adjacent the second bearing (26), is centered on the journal (24) via a centering (29) while a second end of the output flange (17), located remote from the planet carrier, is centered upon the journal (24) via a bushing (31).

7. The driveline for a mobile vehicle according to claim 6, wherein the bushing is cup-shaped and is connected with the journal (24) via at least one connecting element (32) and an outer portion of the bushing (31) abuts against the output flange (17).

8. The driveline for a mobile vehicle according to claim 7, wherein the at least one connecting element (32) faces an exterior of the driveline and is sufficiently exposed so at to be accessible.

9. The driveline for a mobile vehicle according to claim 1, wherein a piston (18) is located adjacent the first and the second bearings (28, 26) for actuating the multi-disc brake (14) in an engagement direction.

10. The driveline for a mobile vehicle according to claim 9, wherein the piston (18) has an automatic piston resetting device (21).

11. The prior art of record fails to show or render obvious the claimed driveline, as recited in the claim; specifically, wherein the planet carrier is releasably supporting a removable output flange; and, the output flange confines axial movement of the inner ring of the second bearing in a first direction while the planet carrier confines axial movement of the inner ring of the second bearing in an opposite direction.

12. The driveline for a mobile vehicle according to claim 11, wherein a first end of the output flange (17), located adjacent the second bearing (26), is centered on the journal (24) via a centering (29) while a second end of the output flange (17), located remote from the planet carrier, is centered upon the journal (24) via a bushing (31).

13. The driveline for a mobile vehicle according to claim 11, wherein the output flange (17) has a central hole which receives the journal (24).

14. The driveline for a mobile vehicle according to claim 11, wherein a toothing arrangement facilitates releasably support of the removable output flange (17) on the journal (24).

15. The driveline for a mobile vehicle according to claim 11, wherein the first bearing (28) has a larger diameter than the second bearing (26).

16. The driveline for a mobile vehicle according to claim 11, wherein the multi-disc brake (14) is located between the output flange (17) and the planetary gear (8).

17. The driveline for a mobile vehicle according to claim 11, wherein a piston (18) is located adjacent the first and the second bearings (28, 26) for actuating the multi-disc brake (14) in a closing direction.

18. The driveline for a mobile vehicle according to claim 17, wherein the piston (18) has an automatic piston resetting device (21).

19. The prior art of record fails to show or render obvious the claimed driveline, as recited in the claim; specifically, wherein the planet carrier has a journal and an output flange is removably connected to the journal; the inner ring of the second bearing is fixed in an axial direction by the output flange and the planet carrier; the bushing is cup-shaped and is connected with the journal via a connecting element; and, an outer portion of the bushing abuts against the output flange.

20. The driveline for a mobile vehicle according to claim 19, wherein the at least one connecting element (32) faces an exterior of the driveline and is sufficiently exposed so at to be accessible.

* * * * *